(12) United States Patent
Loriot et al.

(10) Patent No.: US 10,989,261 B2
(45) Date of Patent: Apr. 27, 2021

(54) POWER-OFF BRAKING SYSTEM

(71) Applicants: Jean-Marc Loriot, Paris (FR);
Christian Salesse, Laroche pres Feyt (FR)

(72) Inventors: Jean-Marc Loriot, Paris (FR);
Christian Salesse, Laroche pres Feyt (FR)

( * ) Notice: Subject to any disclaimer, the term of this patent is extended or adjusted under 35 U.S.C. 154(b) by 0 days.

(21) Appl. No.: 16/335,030

(22) PCT Filed: Sep. 14, 2017

(86) PCT No.: PCT/FR2017/000167
§ 371 (c)(1),
(2) Date: Mar. 20, 2019

(87) PCT Pub. No.: WO2018/055243
PCT Pub. Date: Mar. 29, 2018

(65) Prior Publication Data
US 2019/0249732 A1  Aug. 15, 2019

(30) Foreign Application Priority Data
Sep. 21, 2016 (FR) ...................................... 1601376

(51) Int. Cl.
*F16D 65/18* (2006.01)
*F16D 59/02* (2006.01)
*B60T 13/04* (2006.01)
*F16D 61/00* (2006.01)
*B60T 1/10* (2006.01)
(Continued)

(52) U.S. Cl.
CPC ................ *F16D 65/18* (2013.01); *B60T 1/10* (2013.01); *B60T 7/12* (2013.01); *B60T 13/04* (2013.01); *F16D 55/225* (2013.01); *F16D 59/02* (2013.01); *F16D 61/00* (2013.01); *B60T 2270/60* (2013.01); *F16D 2121/14* (2013.01);
(Continued)

(58) Field of Classification Search
CPC .... F16D 65/18; F16D 65/186; F16D 2121/22; F16D 2121/26; F16D 59/02; B60T 13/04; H02P 3/04
USPC .......................... 188/171, 173; 318/372, 374
See application file for complete search history.

(56) References Cited

U.S. PATENT DOCUMENTS

| 4,947,069 A * | 8/1990 | Grant ..................... H02K 7/125 188/166 |
| 7,419,033 B2 * | 9/2008 | Ito ............................. B66B 5/02 187/254 |

(Continued)

FOREIGN PATENT DOCUMENTS

| CN | 203717730 U | 5/1989 |
| CN | 2583865 Y | 10/2003 |

(Continued)

OTHER PUBLICATIONS

China National Intellectual Property Administration Search Report dated Feb. 2, 2021, in related Chinese Application No. 201780058089.9.

*Primary Examiner* — Thomas J Williams
(74) *Attorney, Agent, or Firm* — Volpe Koenig

(57) ABSTRACT

A power-off emergency braking system, or parking brake system is presented in which, at each power-up, energy is stored in the structure of the brake so as to ensure the power-off application of the brake and the holding of same in the event of an interruption to the power supply of the device.

7 Claims, 3 Drawing Sheets

(51) Int. Cl.
  *B60T 7/12* (2006.01)
  *F16D 55/225* (2006.01)
  *F16D 121/14* (2012.01)
  *F16D 121/26* (2012.01)
  *F16D 125/40* (2012.01)
  *H02P 3/04* (2006.01)

(52) U.S. Cl.
  CPC ...... *F16D 2121/26* (2013.01); *F16D 2125/40* (2013.01); *H02P 3/04* (2013.01)

(56) References Cited

U.S. PATENT DOCUMENTS

| | | | |
|---|---|---|---|
| 7,604,099 B2* | 10/2009 | Kigawa | B66B 5/18 |
| | | | 187/288 |
| 8,020,842 B2* | 9/2011 | Loriot | B23K 11/315 |
| | | | 269/149 |
| 2007/0089937 A1 | 4/2007 | Ito | |
| 2007/0272503 A1 | 11/2007 | Kigawa et al. | |
| 2010/0147633 A1 | 6/2010 | Kim | |
| 2011/0056776 A1 | 3/2011 | Kim | |
| 2012/0153753 A1* | 6/2012 | Hanlon | H02K 7/102 |
| | | | 310/77 |

FOREIGN PATENT DOCUMENTS

| | | |
|---|---|---|
| CN | 1584354 A | 2/2005 |
| CN | 101351293 A | 1/2009 |
| CN | 202364166 U | 8/2012 |
| EP | 1957228 A1 | 8/2008 |
| FR | 1264059 A | 6/1961 |
| FR | 2826622 A | 1/2003 |
| WO | 03052286 A1 | 6/2003 |

* cited by examiner

POWER-OFF BRAKING SYSTEM

FIELD OF THE INVENTION

The objective of the present invention is to create a braking system which applies the brake clamping force at its maximum value, and keeps it applied, each time its electric power supply is no longer assured, for accidental or deliberate reasons.

BACKGROUND

European patent 1 957 228 of Nov. 3, 2006 is known and relates to an electric braking system. That device uses a variable mechanical gain system positioned between the motor shaft and the brake pad application system. Considering an automotive brake specification, in which the force on the brake pads varies from 0 to 15 kN, with an elastic deformation of 1 mm, the energy required to achieve this operation is 7.5 joules.

The maximum stroke of the moving parts of this brake is, by construction, 2.5 rad (less than ½ a turn). If, by using the variable mechanical gain system, a constant torque is applied to the motor during this operation, then, in order to deliver an energy of 7.5 joules, this torque will have a value of 3 Nm.

These are relatively low torque and stroke values and that means that it is possible to envision this solution whereby, on each start-up, the energy which, in the event of a break in the power supply, will allow the brake to be applied and maintained through lack of power can be stored.

The characteristics of these movements would in theory encourage the storage of this energy in mechanical form in springs placed within the very structure of the brake, although that being said, an electrical solution, notably involving capacitors, should not be excluded.

This power-off brake will operate as an emergency brake; it may also be used as a parking brake, holding the vehicle stationary for all the time it is not powered. It may replace the "handbrake".

SUMMARY

The present disclosure is directed to an electric brake, comprising brake pads and a brake motor, wherein on each power up of the brake, said brake motor actuates an energy storage device whereas, for each power down of the brake, the stored energy is used to produce no-power braking, which braking is maintained until power is next applied to the brake.

BRIEF DESCRIPTION OF THE DRAWINGS

A more detailed understanding may be had from the following description, given by way of example in conjunction with the accompanying drawings, wherein like reference numerals in the figures indicate like elements, and wherein.

DETAILED DESCRIPTION OF THE PREFERRED EMBODIMENTS

Figure 1:
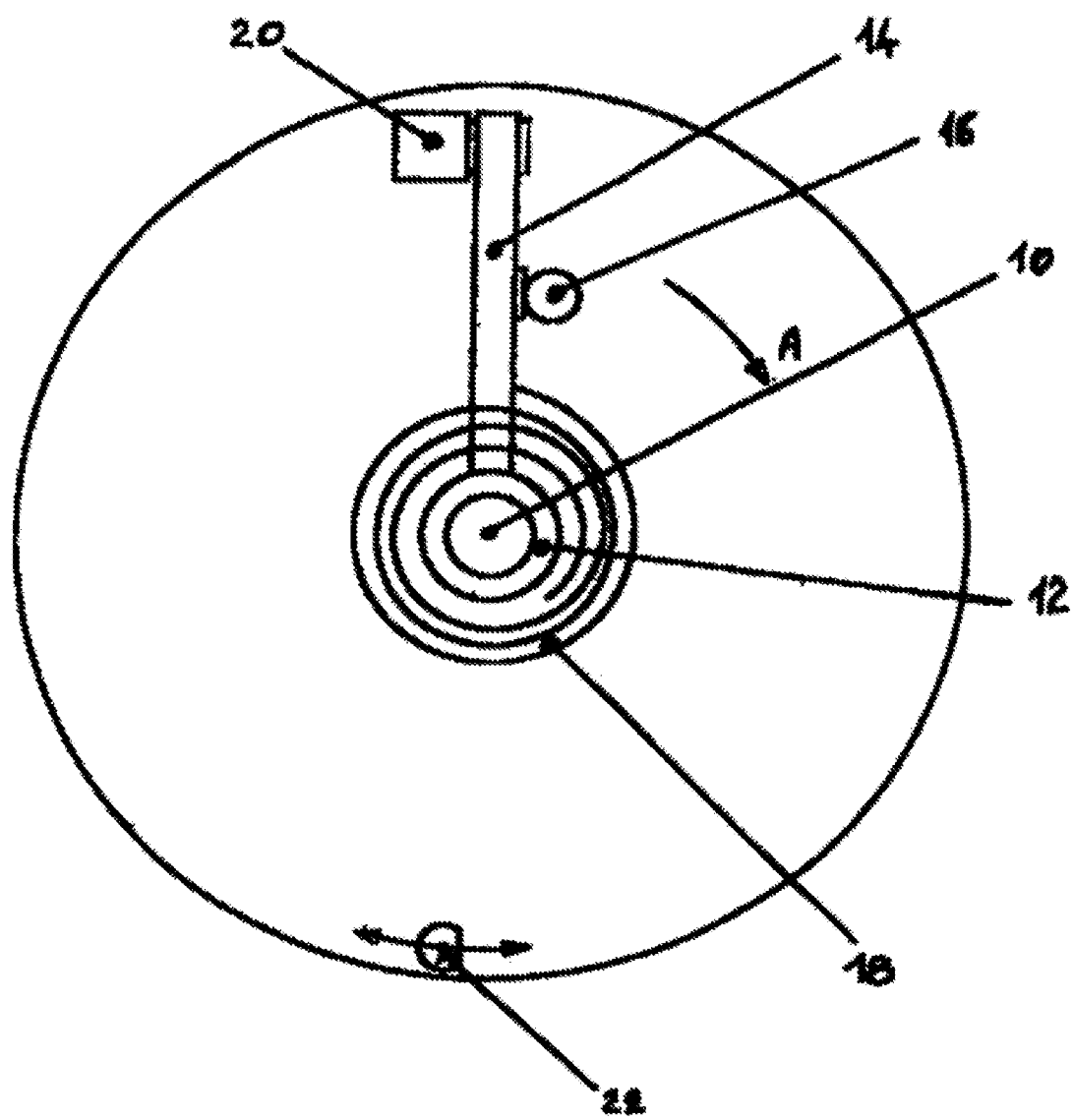
FIGS. 1 and 2 are schematic diagrams of the electric brake.
Figure 3:
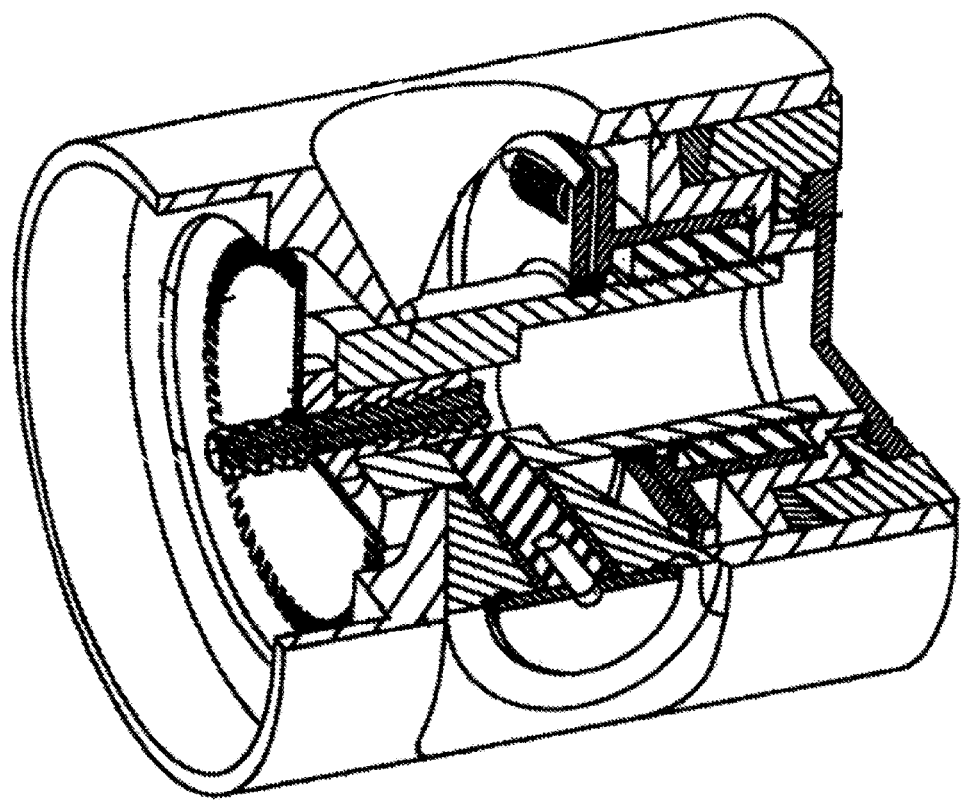
FIG. 3 depicts an electric braking system of the prior art.

In the following description given by way of example, FIG. 1 shows the motor shaft 10 (secured to the screw with the same numeral 10 as that in FIG. 6 of the above referenced patent, that figure, referenced FIG. 3, being appended to the present patent by way of indication). A hub 12 is mounted with the freedom to rotate on this shaft 10. This hub bears an arm 14 which, in this instance, is pressed against an electromagnet 20, the latter, when powered, holds it in this position. A spiral spring 18 applies to the arm 14 a force which tends to cause it to rotate in the direction A with a torque, in automotive applications, at least equal to 3 Nm at the end of stroke. The direction of movement A corresponds to that of applying the brake that it is actuating, and this direction can be reversed if the specific features of the screws and grooves of said brake so justify. An end stop 22 will limit the stroke of the arm 14, notably if this limit cannot be afforded by the limit of the stroke of the moving parts of the brake. A finger 16, secured to the rotor of the motor, will provide the connection between this device that forms the subject of the invention and the actual brake proper.

On each power up of the brake, the motor, while releasing the brake, will, via the finger 16, press the arm 14 against the electromagnet 20 in a movement in the opposite direction to A (the torque required will be the opposite of that required for braking, but have the same order of magnitude). The powered electromagnet will hold the arm 14 in position, with the spring 18 tensioned to the maximum representing the storage of energy. The finger 16 will therefore be able to move freely in the space comprised between the two end points of its stroke that are represented by the electromagnet 20 and the end stop 22 (or the limit of the stroke of the moving parts of the brake). Thus, with the assembly powered, the power-off braking device will have absolutely no impact on the performance of the brake which will therefore be able to move freely in all the space liable to be used for the various braking operations.

Figure 2:
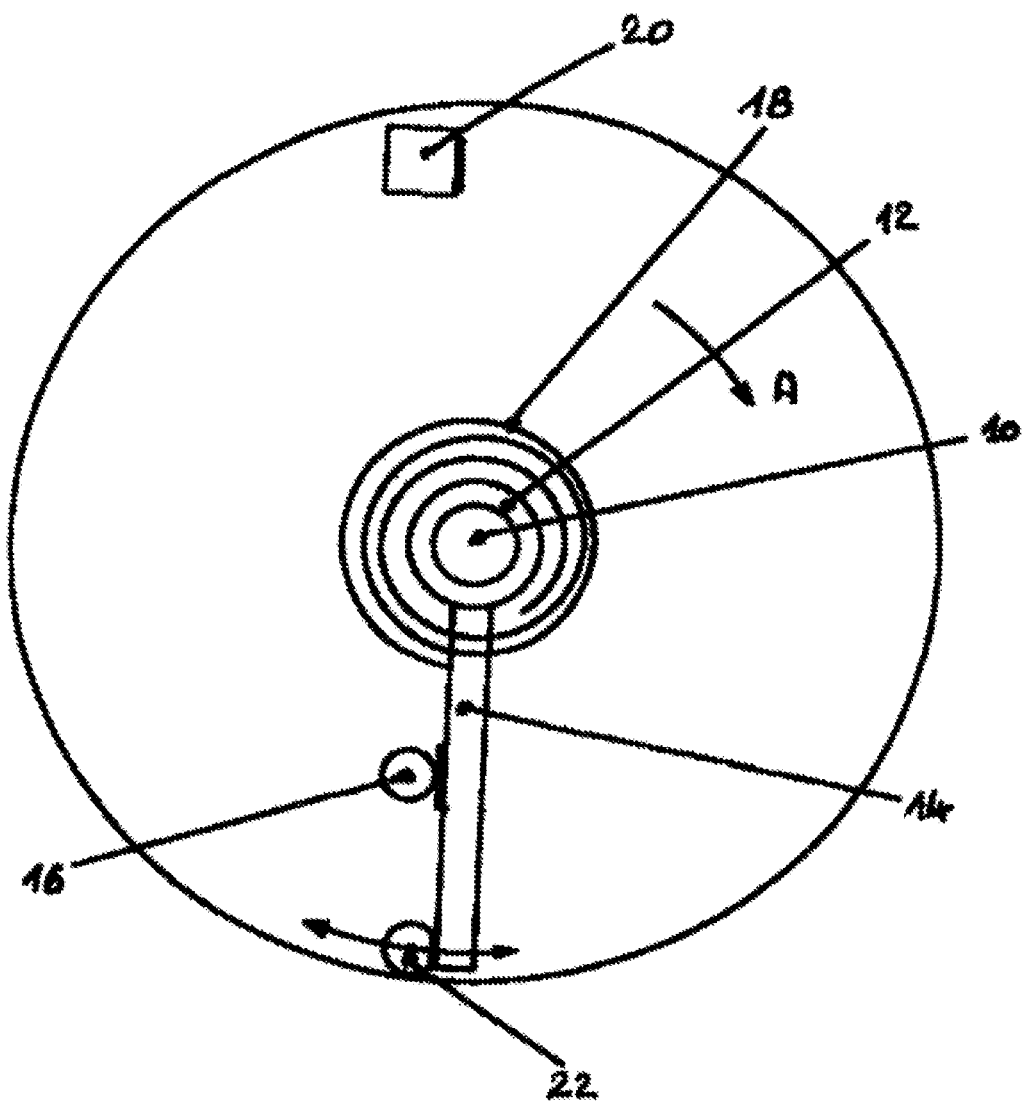

In the event of a loss of power, for accidental or deliberate reasons, the electromagnet 20 will release the arm 14 which, under the stressing of the spring 18, will become pressed firmly against the end stop 22 (or the limit of the stroke of the moving parts of the brake) and in this movement it will carry along with it the finger 16 (whatever the position thereof between 20 and 22) and thus, through the rotor of the motor, cause the brake force to be applied at its maximum value and maintained. FIG. 2 depicts the layout of the various components in this new configuration.

The invention claimed is:

1. An electric brake, comprising brake pads and a brake motor, wherein on each power up of the brake, said brake motor actuates an energy storage device (10, 12, 14, 16, 18) whereas, for each power down of the brake, stored energy is used to produce no-power braking, said no-power braking is maintained until power is next applied to the brake, the energy storage device comprises at least one spring (18) and a motor shaft (10) secured to a spindle of the brake motor, a finger (16) secured to the motor shaft (10) and an arm (14) free to rotate about the motor shaft (10), wherein the storage of energy is performed when the finger (16) driven by the motor pushes the arm (14), and wherein the stored energy comprises mechanical energy.

2. The electric brake as claimed in claim 1, wherein the arm (14) is held by an electromagnet (20), to stress the at least one spring (18), from a time that power is applied to the electric brake until power ceases to be applied.

3. The electric brake as claimed in claim 2, wherein the power down of the electromagnet (20) releases the arm (14) such that the at least one spring (18) moves the arm (14) in a first direction until it comes into contact with an end stop

(22) in order to achieve no-power braking, said no-power braking is maintained until power is reapplied to the brake.

4. The electric brake as claimed in claim 3, wherein the end stop (22) limits the stroke of the arm during no-power braking so that the moving parts are protected, the stroke of the arm (14) being less than half a turn.

5. The electric brake as claimed in claim 4, wherein:
   a force applied by the brake pads to the disk is substantially 15 kN,
   an elastic deformation of the brake pad supports is about 1 mm,
   a torque applied by the at least one spring (18) to the arm (14) is greater than 3 Nm upon contact with the end stop (22) for an angular amplitude of movement of the arm (14) of about 2.5 rad.

6. The electric brake as claimed in claim 1, further comprising a variable mechanical gain system positioned between the motor shaft and a brake pad clamping system.

7. The electric brake as claimed in claim 1, wherein the energy storage device comprises a capacitor.

* * * * *